United States Patent
Taylor et al.

(10) Patent No.: US 7,167,488 B2
(45) Date of Patent: Jan. 23, 2007

(54) METHOD AND APPARATUS FOR PROCESSING VARIABLE BIT RATE INFORMATION IN AN INFORMATION DISTRIBUTION SYSTEM

(75) Inventors: Clement G. Taylor, Plainsboro, NJ (US); Jesse S. Lerman, Princeton, NJ (US)

(73) Assignee: Sedna Patent Services, LLC, Philadelphia, PA (US)

( * ) Notice: Subject to any disclaimer, the term of this patent is extended or adjusted under 35 U.S.C. 154(b) by 1195 days.

(21) Appl. No.: 09/925,216

(22) Filed: Aug. 8, 2001

(65) Prior Publication Data

US 2001/0055302 A1 Dec. 27, 2001

Related U.S. Application Data

(63) Continuation of application No. 09/148,020, filed on Sep. 3, 1998.

(51) Int. Cl.
H04H 1/04 (2006.01)

(52) U.S. Cl. ..................................................... 370/486

(58) Field of Classification Search ................ 370/486, 370/395.1, 412, 465, 232, 236, 395.4, 395.41, 370/395.43; 340/825.51; 709/207
See application file for complete search history.

(56) References Cited

U.S. PATENT DOCUMENTS

| | | | |
|---|---|---|---|
| 5,533,009 A | 7/1996 | Chen | 370/232 |
| 5,541,852 A * | 7/1996 | Eyuboglu et al. | 709/232 |
| 5,548,574 A | 8/1996 | Shimoyoshi et al. | 369/124 |
| 5,579,527 A | 11/1996 | Chin et al. | 395/800 |
| 5,671,377 A | 9/1997 | Bleidt et al. | 395/328 |
| 5,687,167 A | 11/1997 | Berlin et al. | 370/254 |
| 5,819,036 A | 10/1998 | Adams et al. | 395/200.3 |
| 6,438,596 B1 * | 8/2002 | Ueno et al. | 709/226 |

FOREIGN PATENT DOCUMENTS

| | | |
|---|---|---|
| EP | A-0 739 140 | 10/1996 |
| EP | 0 798 924 A2 | 1/1997 |
| WO | 97/39584 | 10/1997 |
| WO | 98/04975 | 2/1998 |
| WO | WO99/00984 A | 1/1999 |

OTHER PUBLICATIONS

Farber et al., "Robust H.263 Compatible Video Transmission for Mobile Access to Video Servers," *Telecommunications Institute, University of Erlangen-Nuremberg*, pp. 73-76, 1997.

Grod et al., "Scalable Codec Architectures for Internet Video-on-Demand" *Telecommunication Laboratory, University of Erlangen-Nuremberg*, pp. 357-361, 1998.

Girod et al., "A Scalable Codec for Internet Video Streaming," *Telecommunications Institute, University of Erlangen-Nurnberg*, pp. 221-224, 1977.

* cited by examiner

*Primary Examiner*—Chi Pham
*Assistant Examiner*—Alexander O. Boakye
(74) *Attorney, Agent, or Firm*—Patterson & Sheridan, LLP (57) ABSTRACT

A method and apparatus for managing both link and disk bandwidth utilization within the context of a multiple subscriber or user information distribution system by selectively providing variable bitrate and constant low bitrate information streams to one or more subscribers.

23 Claims, 5 Drawing Sheets

METHOD AND APPARATUS FOR PROCESSING VARIABLE BIT RATE INFORMATION IN AN INFORMATION DISTRIBUTION SYSTEM

CROSS-REFERENCE TO RELATED APPLICATIONS

This application is a continuation of commonly assigned U.S. patent application Ser. No. 09/148,020, filed Sep. 3, 1998, and entitled METHOD AND APPARATUS FOR PROCESSING VARIABLE BIT RATE INFORMATION IN AN INFORMATION DISTRIBUTION SYSTEM.

The invention relates to information distribution systems generally and, more particularly, the invention relates to a method and apparatus for adapting the distribution of stored information streams in response to disk bandwidth availability and/or distribution channel bandwidth availability.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

In information distribution applications, such as video on demand (VOD) and other applications in which a plurality of subscribers receive respective information stream(s), it is desirable to use variable bit rate (VBR) streams so that video image quality and link (network) utilization may be maximized. With VBR streams, the bit rate fluctuates with the complexity of the video. That is, more bits are given to complex frames and fewer bits are given to the easy to code frames. However, "serving" such VBR information streams provides a substantial challenge when implementing a cost effective video server. The primary difficulty is determining is what happens when the demand for bandwidth exceeds the channel capacity.

VBR MPEG is currently used in one or more satellite television systems. Such systems typically encode a set of channels (i.e., audio-visual programs) together, using a statistical multiplexer that drives the rate controller of each channel encoder. All the decisions about how to allocated the available bits are decided when the video is being encoded, just before transmission.

Unfortunately, the above-described encoding-level approach to bandwidth management does not work within the context of, e.g., a video server that typically delivers pre-encoded content, and typically has no control over which streams need to be sent over a given link. Thus, such video servers typically serve VBR streams by reserving disk and link bandwidth based on a maximum bit rate that the served stream will require. While this technique works well, the additional video quality is provided at the expense of underutilized link bandwidth. Moreover, in systems where multiple subscribers require information stored in a single mass storage unit (or array of mass storage devices), disk bandwidth (i.e., the maximum amount of data that may be retrieved in a given time period) may be exceeded by the aggregated bandwidth demands of the subscribers, especially where VBR streams are retrieved from the disk.

Therefore, it is seen to be desirable to provide a method and apparatus for providing high quality information streams while managing both link and disk bandwidth utilization within the context of a multiple subscriber or user information distribution system.

SUMMARY OF THE INVENTION

The invention is a method and apparatus for managing both link and disk bandwidth utilization within the context of a multiple subscriber or user information distribution system by selectively providing variable bitrate and constant low bitrate information streams to one or more subscribers.

Specifically, in an information distribution system comprising an information server providing information to a plurality of subscribers via a communications link, a method according to the invention for managing bandwidth utilization comprises the steps of: monitoring an indicium of bandwidth utilization within the information distribution system; providing, via the communications link and in response to the indicium of bandwidth utilization indicating that an overutilization condition does not exist, a first variable bitrate information stream to at least one of the plurality of subscribers, the first variable bitrate information stream having associated with it a bitrate that may vary between a nominal first lower bitrate and a nominal first upper bitrate; and providing, via the communications link and in response to the indicium of bandwidth utilization indicating that an overutilization condition does exist, a second variable bitrate information stream to at least one of the plurality of subscribers, the second variable bitrate information stream having associated with it a bitrate that may vary between a nominal second lower bitrate and a nominal second upper bitrate, the nominal second lower bitrate being and the nominal second upper bitrate being less than the nominal first upper bitrate.

The above-mention indicium of bandwidth utilization comprises one of a communications link bandwidth utilization indicium and a storage device access bandwidth utilization indicium, the storage device being used to store the first and second variable bitrate information streams.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in any information distribution system in which maximal bandwidth utilization and maximal information quality is important.

While the invention will be described within the context of an interactive information distribution system, it must be noted that such interaction is not required to practice the invention.

Figure 1:
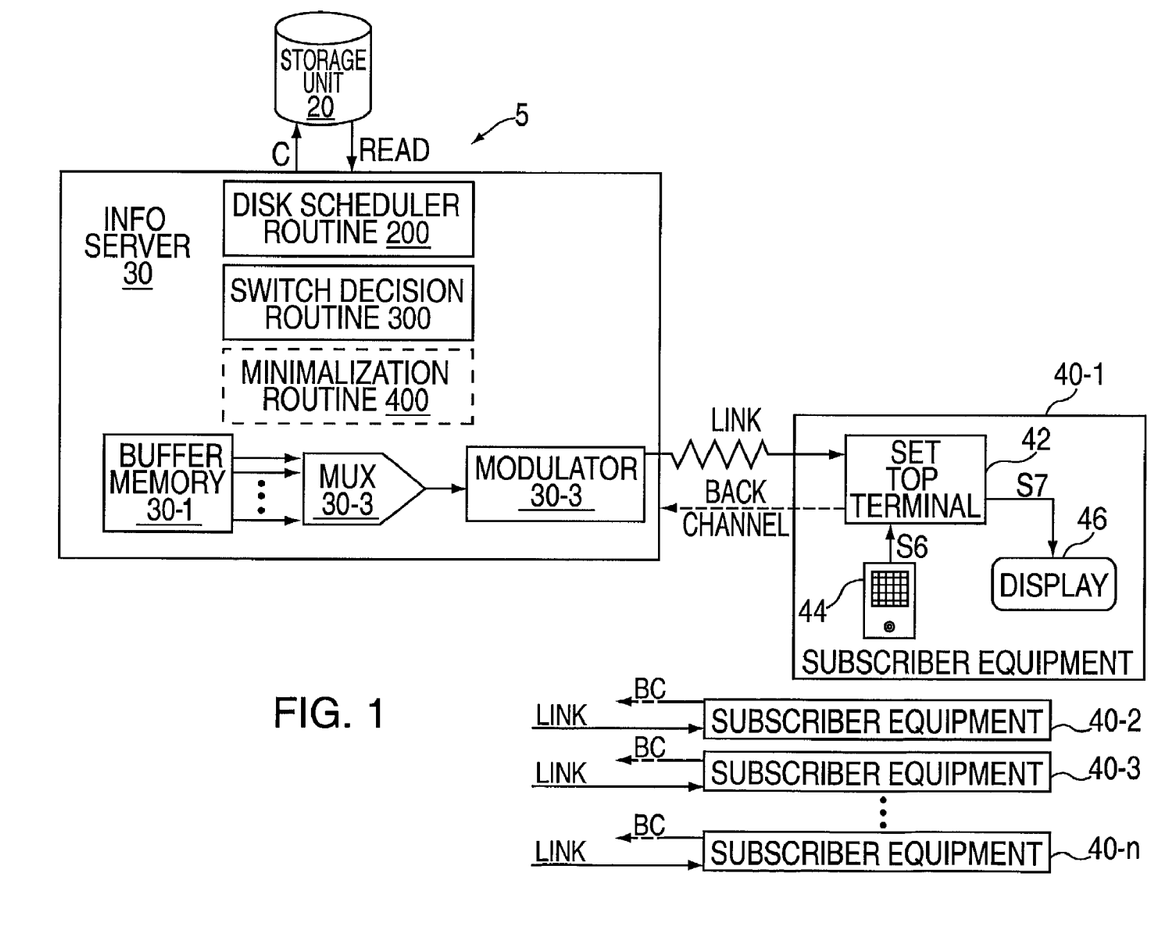
FIG. 1 depicts an information distribution system 100 including apparatus according to the invention.

FIG. 1 depicts an interactive information distribution system 100 including apparatus according to the invention. Specifically, the interactive information distribution system 100 comprises information provider equipment 5 that provides information to a plurality of subscriber equipment 40-1 through 40-n via a communications link LINK. Optionally, the plurality of subscriber equipment 40-1 through 40-n send messages and other commands (e.g., program requests) to the information provider equipment 5 via a back channel BC.

The provider equipment 5 includes an information server 30 and an information storage unit 20. The information storage unit 20, illustratively a mass storage unit such as a disk array, is responsive to a control signal C produced by the information server 30. The control signal C is indicative of one or more of a plurality of stored programs or other information that are to be served, via the information server 30, to a respective one or more subscribers 40. The information storage unit 20 couples the retrieved information stream(s) to a respective one or more of a plurality of data outputs READ. The information server 30 reads the retrieved information from the data outputs READ of the information storage unit 20.

A storage unit 20 suitable for use in the present invention is described by Chin et al. in U.S. Pat. No. 5,579,527, and herein incorporated by reference in its entirely. A system for supplying streams to multiple users suitable for use in the present invention is described by Bleidt et al. in U.S. Pat. No. 5,671,377, and herein incorporated by reference in its entirely. It must be noted that while the invention may advantageously utilizes a massively parallel storage, retrieval and distribution system, the invention does not require the use of such a system. Rather, the invention is well suited to any storage arrangement in which the amount of data to be retrieved in any given amount of time is so great that disk (and input/output) bandwidth management becomes a critical consideration, such as in video on demand and video serving applications.

A method and apparatus for minimizing disk drive access time suitable for use in the present invention is described by Armstrong in commonly assigned U.S. patent application Ser. No. 08/818,172, filed on Mar. 14, 1997 and incorporated herein by reference in its entirety.

The information server 30 comprises a buffer memory 30-1, a multiplexer 30-2 and a modulator 30-3. The information server 30 also comprises a microprocessor and other support circuitry (not shown). The buffer memory 30-1 is capable of holding at least one service period (i.e., one extent) worth of VBR and CLBR streams for each active subscriber in the system. The exemplary embodiment uses a service period of two seconds. Thus two seconds of CLBR and, if sufficient disk bandwidth was available, VBR streams for each user. In the case of 30 frames per second video, each memory portion holds 30 frames of video and any associated audio information. The multiplexer 30-2 utilizes a direct memory access (DMA) output link table to access appropriate portions of the buffer memory 30-1, and multiplexes the accessed information to form a multiplexed output stream. The multiplexed output stream is modulated by the modulator 30-3 in a known manner and transmitted via the communications link LINK to the subscriber(s).

The information server 20 includes means for executing a disk scheduler routine 200, a switch decision routine 300 and (optionally) a switch minimization routine 400. These routines will be described in more detail below with respect to FIGS. 2–4. Briefly, the disk scheduler routine 200 models the demand for disk bandwidth and anticipates when the demand will exceed the available bandwidth; the switch decision routine 300 analyzes the demand generated by all the streams that share a common output link to determine when, and if, the server needs to switch between the VBR and CLBR streams; and the switch minimization routine 400 provides a "second pass" at the DMA output table formed in the switch decision routine 300 to smooth out any excessive switching transitions such that each user in the system "suffers" approximately the same amount of service degradation.

The subscriber equipment 40 contains a set top terminal 42, an input device 44, and a display device 46. The set top terminal 42 receives and demodulates the information stream transmitted by the information server 30. The set top terminal also transmits information, such as subscriber requests, to the information server 30 via the back channel BC.

The set top terminal 42 includes a microprocessor and various support circuitry (not shown). The set top terminal 42 is responsive to the input device 44 to provide interactive control of the information provided by the information server 30. The provided information is controlled by a subscriber via the input device 44, e.g., an infrared (IR) or radio frequency (RF) remote control unit. The provided information, e.g., audio, video, still photographs, graphics and the like are portrayed on the display device 46 such as a television, video monitor, and the like.

If the optional back channel BC is used, then the information server 30 receives requests for, e.g., audiovisual programming or other information from subscribers via the back channel BC, illustratively a quadrature phase shift keying (QPSK) channel or a public telecommunication channel. In response to a subscriber request (or, e.g., at a scheduled transmission time), information server 30 retrieves the requested audiovisual programming or other information from the information storage unit 20. The retrieved information stream(s) associated with each requesting subscriber, and a terminal identification number (TID) relating the retrieved information stream(s) with the appropriate subscriber, are then modulated or otherwise incorporated into a communications link information stream that is transmitted to the subscribers via the communications link.

The communications link information stream is then transported to the subscribers via the communications link LINK, illustratively a Quadrature Amplitude Modulation (QAM) transmission channel. It should be noted that the communications link LINK and the back channel BC may be carried by a common fiber or cable network at mutually exclusive spectral regions. The communications link LINK and back channel BC may also be carried by distinct communications networks. For example, the communications link LINK may be a fiber optic, cable television, satellite or terrestrial broadcast network and the like.

It is important to note that the communications link has associated with it a finite amount of bandwidth. For example, if the communications link is capable of supporting a maximum bitrate of 100 Mbps, then the sum of the bitrates of the information streams contemporaneously provided to the subscribers (plus any overhead information, such as encryption information, routing information and the like) must not exceed the maximum communications link bitrate. Thus, in the case of 5 Mbps fixed bitrate information streams (disregarding overhead bitrate utilization) up to 20 subscribers may be serviced during any one time interval.

In one embodiment of the invention, the information server 30 models the bandwidth utilization of the communications link. The link bandwidth model may comprise a software or hardware or a combination of both software and hardware. The purpose of the link bandwidth model is to determine if a maximum "safe" bitrate utilization threshold has been exceeded. The safe bitrate utilization threshold may be predefined or adjustable. For example, the safe bitrate utilization threshold may be defined as a percentage (e.g., 95%) of the maximum bitrate of the communications link, or as an actual bitrate (e.g., 95 Mbps).

The VOD system described thus far provides audiovisual programming and other information to subscribers in response to, e.g., subscriber requests for such programming or information. The audio-visual programming an other information is stored within the storage unit as two distinct streams.

A first stream associated with each program comprises a variable bit rate (VBR) stream, illustratively an MPEG-like transport stream that has been encoded such that the quality or fidelity level of individual encoded frames (e.g., video frames) is relatively constant. That is, the VBR stream is produced by, e.g., an MPEG encoder including a rate controller that operates to keep the quality or fidelity (as defined by, e.g., quantizer step size and other parameters) of each video frame at a relatively constant level. Since some frames will require more data to encode than others, the bitrate of this stream will be inherently variable. In one embodiment of the invention, the bitrate of this "quality constrained" stream (i.e., the VBR stream) is also held to within a relatively wide bitrate range of 0.5 Mbps to 9.0 Mbps, though centered around an average or "target" data rate.

A second stream associated with each program comprises a constant low bitrate (CLBR) stream, illustratively an MPEG-like transport stream that has been encoded such that the bitrate of the encoded stream is relatively constant. That is, the CLBR stream is produced by, e.g., an MPEG encoder including a rate controller that operates to keep the bitrate of the encoded stream at a relatively constant level. In one embodiment of the invention, the bitrate of this "bitrate constrained" stream (i.e., the CLBR stream) is also held to within a relatively low bitrate range of 0.75 Mbps to 1.5 Mbps.

The CLBR stream may be produce by transcoding the VBR stream. That is, the output of the MPEG (or other) encoder producing the VBR stream may be modified such that the bitrate is reduced at the expense, e.g., of variations in frame quality.

By storing both of a VBR and CLBR stream associated with each program, the invention may read whichever stream (preferable the VBR stream) that the disk bandwidth will support. Ideally, both the VBR and CLBR streams are read for each respective subscriber. If the disk bandwidth is too low at any given time, then it may be necessary to read only one of the streams (i.e., the CLBR stream) for one or more subscribers.

Figure 5:
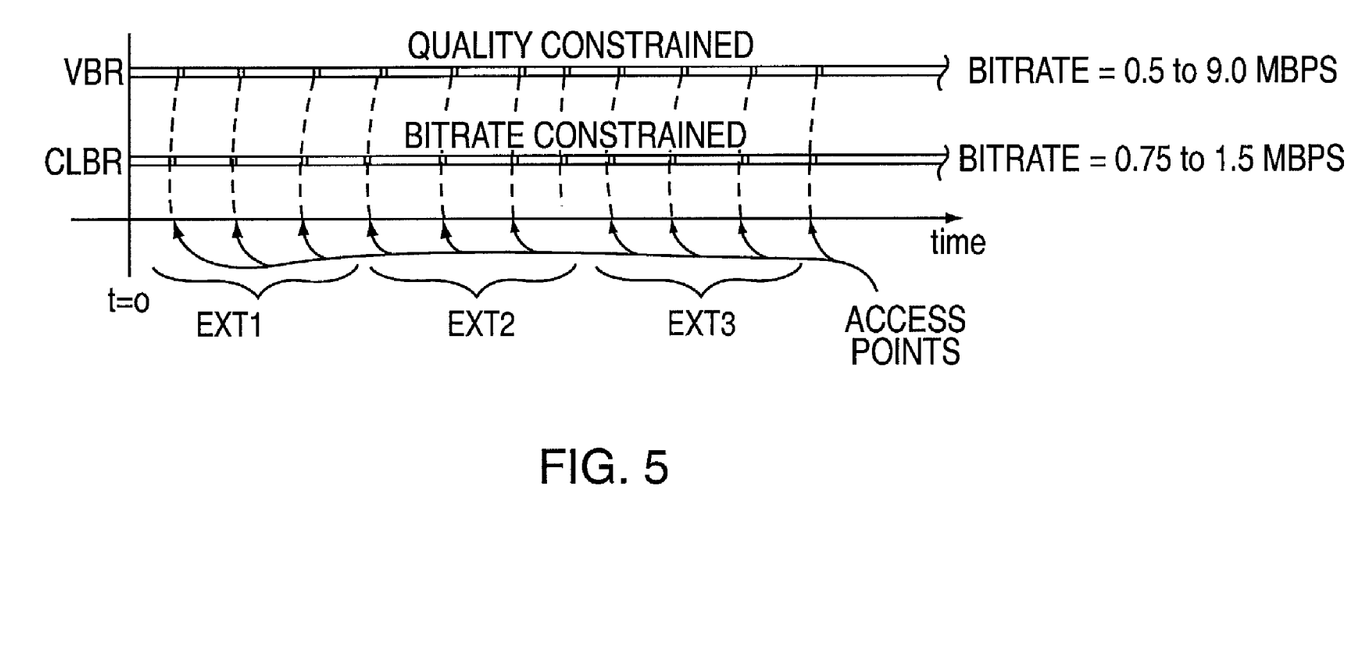
FIG. 5 depicts a graphical representation of a VBR extent and a CLBR extent useful in understanding the present invention.

FIG. 5 depicts a graphical representation of a VBR extent and a CLBR extent useful in understanding the present invention. Specifically, FIG. 5 depicts in a top row a VBR stream having a variable bitrate of 0.5 to 9 Mbps and in a bottom row a CLBR stream having a bitrate of 0.75 to 1.5 Mbps. The two rows are depicted as a function of time. It must be noted that while the CLBR stream is termed a "constant low bitrate" stream, the bitrate does vary somewhat.

The VBR and CLBR stream are each divided into time extents of, illustratively, 2 seconds each. FIG. 5 depicts three such extents (i.e., EXT 1, EXT 2 and EXT 3). Each time extent includes a plurality of access points such as sequence headers or intra-coded information frames (i.e., I-frames). It must be noted that the amount of data within one extent of a VBR stream will be considerably greater than the amount of data within the corresponding CLBR extent. Thus, to assist in switching between corresponding VBR and CLBR streams, synchronization (i.e., indexing information) and predefined access points used. The access points (ACCESS POINTS) shown in FIG. 5 assume a 30 frames per second video stream having a group of pictures (GOP) structure that repeats twice a second.

The access points are points within the VBR or CLBR stream where the stream may be entered without producing a significant "glitch" at a subscriber side decoder (e.g., due to buffer overflow/underflow, prediction errors or acquisition errors). These access points are aligned on a frame to frame or header to header basis within the corresponding VBR and CLBR streams.

The synchronization or indexing information may be contained within, e.g., a "server control" packet (i.e., identified by a unique packet identification or PID), a user data field or other portion of the streams. The purpose of the indexing information is to point from one stream into another such that stream switching (i.e., multiplexing) may be performed without loss of content continuity or significant artifact generation.

In the exemplary embodiment, the corresponding CLBR and VBR streams are stored contiguously on a disk within the storage unit 20 so they can be read together with a single seek. When sufficient disk bandwidth is not available, only the CLBR portion of an extent is read, otherwise both components are read. When link bandwidth is not available for the VBR stream, then the CLBR data is sent.

The exemplary bitrate values are selected only for illustrative purposes. The actual bitrate values are preferably selected with respect to a desired encoding quality level. The extent time is based on disk parameter such as seek time and disk performance (e.g., data rate).

Figure 2:
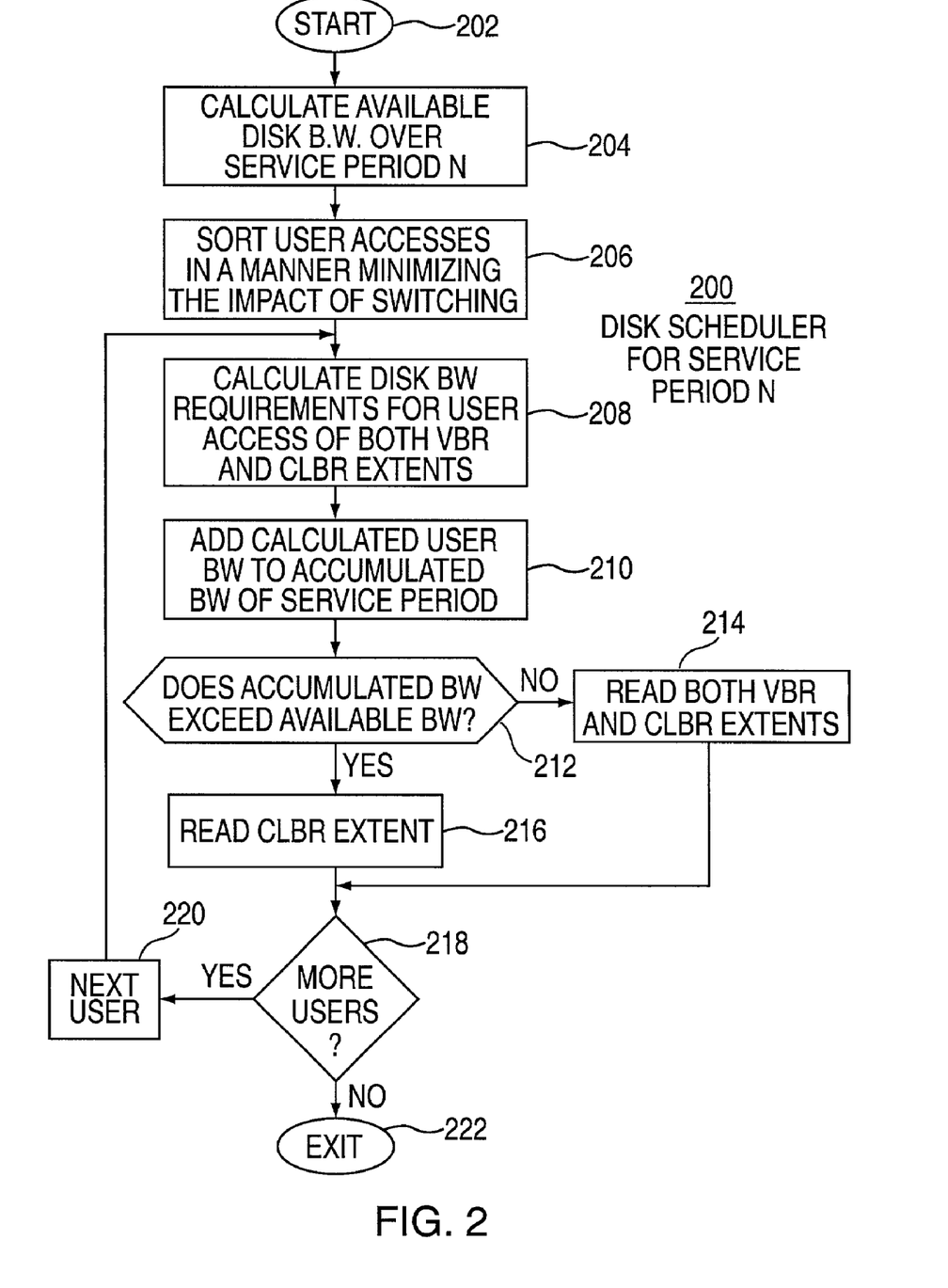
FIG. 2 depicts a flow diagram of a disk scheduler routine 200 suitable for use in the apparatus of FIG. 1.

FIG. 2 depicts a flow diagram of a disk scheduler routine 200 suitable for use in the apparatus of FIG. 1. Specifically, the disk scheduler routine 200 is used to read information from the storage unit 20 at a maximum rate defined by the bandwidth of the components comprising the storage unit 20.

The disk scheduler routine 200 executed for each service period N. A service period is the amount of time required to play a full extent of video information. In the exemplary embodiment, this amount of time is approximately two seconds. There is, of course, a variable number of bytes within one extent, since the number of bytes depends upon the average bitrate of the variable bitrate stream.

The routine 200 is entered at step 202 and proceeds to step 204, where the available disk bandwidth over the present service period N is calculated. The routine 200 then proceeds to step 206.

At step 206 the routine 200 sorts the users that need to access the disk during the service period N in a manner that reduces the impact of switching between VBR and CLBR streams. That is, the users are sorted into a prioritized list where some users are preferentially allocated a VBR stream (others are optionally preferentially allocated a CLBR stream). For example, those users who are presently receiving a VBR stream may preferentially continue to receive a VBR stream, thereby avoiding any switching artifacts. Similarly, those users who very recently switched from a VBR stream to a CLBR stream are preferentially allocated a CLBR stream, thereby avoiding additional switching artifacts. The inventors note the artifacts due to stream switching operations tend to be more objectionable to the average viewer (i.e., subscriber) than the moderate quality degradation related to a lower bitrate video stream. The routine 200 then proceeds to step 208.

At step 208, the disk BW required for the next prioritized user (per the list generated at step 206) to access both the VBR and CLBR extents associated with that user for the present service period N are calculated. The routine 200 then proceeds to step 208.

At step 210, the user disk BW calculated at step 208 as added to an accumulated disk BW for the service period. That is, an accumulated service period BW variable is initialized to zero for each service period (e.g., at step 204) and incremented by the amount calculated in step 208. The routine 200 then proceeds to step 212.

At step 212 a query is made as to whether the accumulated BW (from step 210) exceeds the available BW (from step 204). If the query at step 212 is answered affirmatively, then the routine 200 proceeds to step 216. If the query at step 212 is answered negatively, then the routine 200 proceeds to step 214.

At step 214, both the VBR and CLBR extents associated with the user for the present service period N are retrieved from the disk (e.g., storage unit 20). The routine 200 then proceeds to step 218.

At step 216, only the CLBR extent associated with the user for the present service period N is retrieved from the disk (e.g., storage unit 20). The routine 200 then proceeds to step 218.

At step 218 a query is made as to whether there are more users to be processed. That is, a query is made as to whether each user sorted at step 206 to form the prioritized user list has been processed. If the query at step 218 is answered affirmatively, then the routine 200 proceeds to step 222 where it is exited. If the query at step 218 is answered negatively, then the routine 200 proceeds to step 220, where the next user on the prioritized list is identified. Steps 208–218 are then repeated for the next user.

In the exemplary embodiment, the disk scheduler routine 200 reads the appropriate stream(s), which are then stored in the buffer memory 30-1 of the information server 30. That is, each of the subscribers is allocated a portion of the buffer memory 30-1. The allocated portion for each subscriber is used to store one extent of the respective CLBR stream and, if read, VBR streams.

Figure 3:
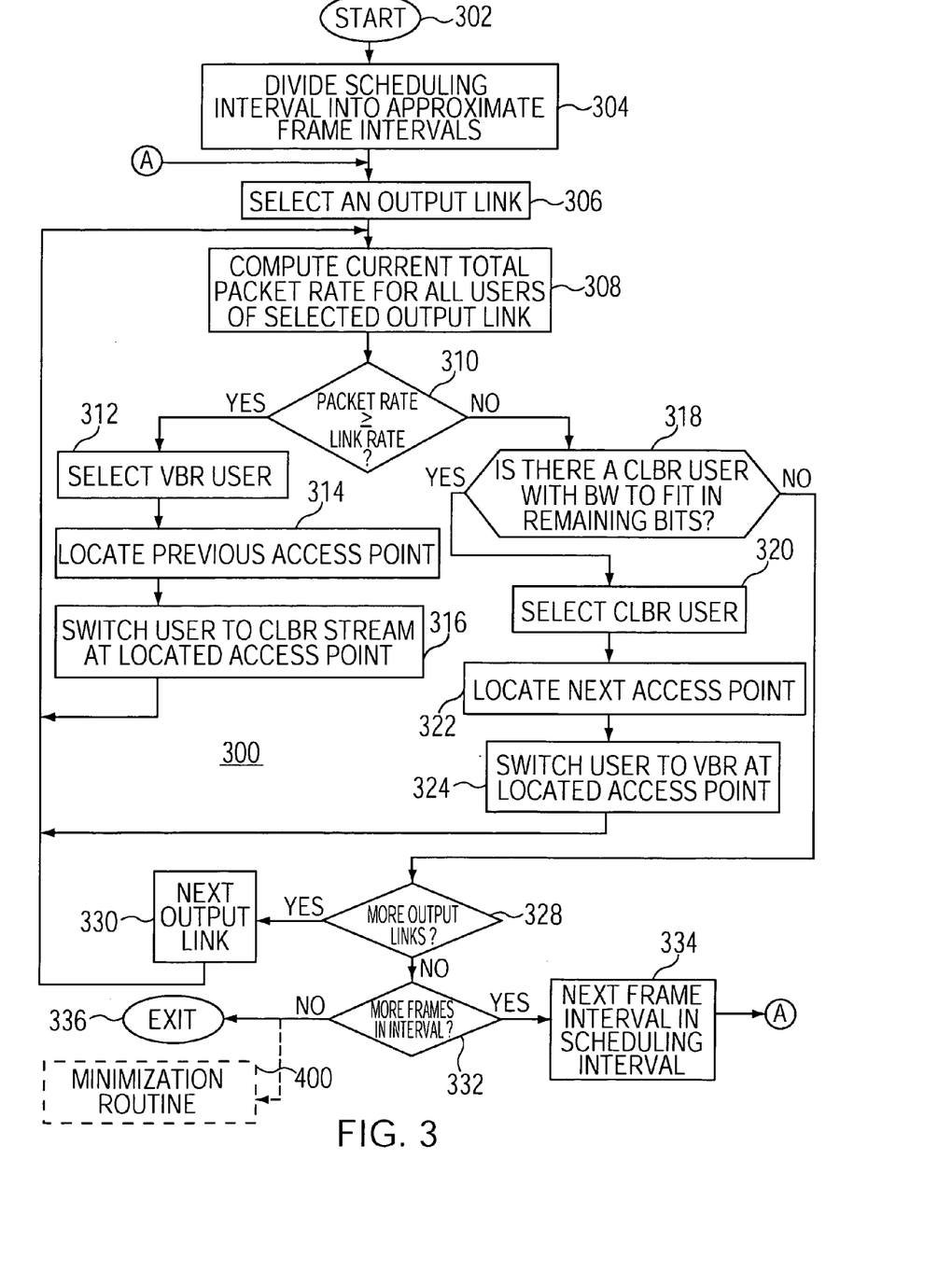
FIG. 3 depicts a flow diagram of an output switch decision routine 300 suitable for use in the apparatus of FIG. 1.

FIG. 3 depicts a flow diagram of an output switch decision routine 300 suitable for use in the apparatus of FIG. 1. Specifically, the output switch decision routine 300 is executed for a service period N-1 (i.e., the service period temporally preceding the service period processed by the disk scheduler routine 200 of FIG. 2). As previously noted, the exemplary embodiment uses a service period of two seconds. Thus two seconds of CLBR and, if sufficient disk bandwidth was available, VBR streams for each user. In the case of 30 frames per second video, each memory portion holds 30 frames of video and any associated audio information. The output switch decision routine 300 is used to selectively couple the extent information stored in the buffer memory 30-1 to the multiplexer 30-3 for multiplexing into the link information stream (which is then modulated and transmitted to the subscribers). The output switch decision routine 300 selects available VBR and CLBR streams from the buffer memory 30-1 in a manner tending to maximize the utilization of the bandwidth of the communications link LINK.

The output switch decision routine 300 is used to select the appropriate values for use in a, e.g., an output table for use in a direct memory access (DMA) of the buffer memory 30-1 by the multiplexer 30-3. The DMA output table comprises a list of DMA control commands associated with each active subscriber in the system. Each DMA control command comprising a pointer to a respective portion of memory (e.g., the access point of a stream to be transmitted to a user), a duration parameter identifying an amount of memory to be read (e.g., time or amount of data), and a bitrate parameter identifying a rate at which the identified data is to be read.

The output switch decision routine 300 is entered at step 302 and proceeds to step 304, where the scheduling interval is divided into a plurality of frame intervals approximating, e.g., an average video frame (e.g., 33 milliseconds). The frame interval selected is not critical, only that the interval be relatively brief compared to the extent interval. The routine 300 then proceeds to step 306.

At step 306 an output link, corresponding to an output information stream to be delivered to one or more subscribers via the communications link LINK, is selected. The routine 300 then proceeds to step 308.

At step 308 the current total packet rate for all users on the selected output link over the determined frame interval is computed. This computation may be performed with, e.g., meta-data stored within each CLBR stream and VBR stream. The meta-data, as previously described, includes information such as the size of the frames within the stream, the appropriate entry points into the stream and frame synchronization information defining the relative positions of related frames within associated CLBR and VBR streams. The routine 300 then proceeds to step 310.

At step 310 a query is made as to whether the packet rate is greater than or equal to the link rate. That is, a query is made as to whether the total packet rate for the particular output link exceeds the maximum data rate for that output link over the current frame interval for all the users. If the query at step 310 is answered affirmatively, then the routine 300 proceeds to step 312. If the query at step 310 is answered negatively, then the routine 300 proceeds to step 318.

At step 312 one of the VBR users is selected. It must be noted that there will always be at least one VBR user, since the CLBR is selected such that if all subscribers used a CLBR stream, the link bitrate would be much lower than the maximum link bitrate. In this manner, at least one subscriber is always able to use a VBR stream. The routine 300 then proceeds to step 314.

At step 314 the portion of the buffer memory 30-1 allocated to the VBR stream of the selected VBR user is scanned temporally backwards until the previous access point within the stored VBR stream is located. This is the point within the VBR stream that stream may be entered (i.e., sequence header or I-frame) without a significant generation of artifacts. Similarly, since the CLBR stream associated with the VBR stream may be entered at this point, meta-data within the VBR stream (or CLBR stream) may be used to identify the access point within the CLBR stream. The routine 300 then proceeds to step 316.

At step 316 a switch decision is made to switch from the VBR stream (at the located access point) to the CLBR stream (at the corresponding access point). That is, a switch is made between the VBR and CLBR streams after aligning the streams at the located access point. In this manner, the multiplexer 30-3 of FIG. 1 stops including the VBR stream (and starts including the CLBR stream) in the multiplexed output stream at the located access point. The routine 300 then proceeds to step 308.

It must be noted that the operation of steps 312 through 316 is directed toward reducing the bandwidth necessary to transmit the data identified in, e.g., the DMA output table. However, since the purpose of the invention is to maximally utilize the available link bandwidth, it is desirable to use any available bandwidth (if possible). This recapturing of bandwidth occurs in steps 318 to 326.

At step 318 a query is made as to whether a subscriber or user presently provided with a CLBR stream has an associated VBR stream that may "fill up" the available link bandwidth. That is, can a VBR stream be substituted for a CLBR stream such that the available link bandwidth may be recaptured? If the query at step 318 is answered negatively, then the routine 300 proceeds to step 328. If the query at step 318 is answered affirmatively, then the routine 300 proceeds to step 320.

At step 320, one of the CLBR users (there may be more than one) having an VBR stream that may "fill up" the available link bandwidth is selected. The routine 300 then proceeds to step 322.

At step 322 the portion of the buffer memory 30-1 allocated to the CLBR stream of the selected CLBR user is scanned temporally forwards until the next access point within the stored CLBR stream is located. This is the point within the CLBR stream that stream may be entered (i.e., sequence header or I-frame) without a significant generation of artifacts. Similarly, since the VBR stream associated with the CLBR stream may be entered at this point, meta-data within the CLBR stream (or VBR stream) may be used to identify the access point within the VBR stream. The routine 300 then proceeds to step 324.

At step 324 a switch decision is made to switch from the CLBR stream (at the located access point) to the VBR stream (at the corresponding access point). That is, a switch is made between the CLBR and VBR streams after aligning the streams at the located access point. In this manner, the multiplexer 30-3 of FIG. 1 stops including the CLBR stream (and starts including the VBR stream) in the multiplexed output stream at the located access point. The routine 300 then proceeds to step 308.

It must be noted that a next access point in a CLBR stream is located in step 322, whereas a previous access point in a VBR stream was located in step 314. This is because the steps associated with step 322 are directed toward increasing a bitrate, while those associated with step 314 are directed toward decreasing a bitrate. Thus, by locating a next access point in step 322, the potential for exceeding the bit budget by repeating information (i.e., duplicating information in the output stream) is obviated.

At step 328 a query is made as to whether there are more output links to be processed. If the query at step 328 is answered affirmatively, then the routine 300 proceeds to step 330, where the next output link is selected, and to step 308. If the query at step 328 is answered negatively, then the routine 300 proceeds to step 332.

At step 332 a query is made as to whether there are more frame intervals within the present scheduling interval to be processed. If the query at step 332 is answered affirmatively, then the routine 300 proceeds to step 334, where the next frame interval within the present scheduling interval is selected, and to step 308 (where the first output link in the next frame interval is selected). If the query at step 332 is answered negatively, then the routine 300 proceeds to step 336 where it is exited.

It must be noted that the memory scanning operations of steps 314 and 322 may be performed directly on the buffer memory 30-1. However, since the meta-data gives sufficient indexing information it is preferable (and faster) to find appropriate stream locations using the meta-data to index into the buffer memory 30-1.

Upon the complete execution of the output switch decision routine 300, an initial DMA output table (i.e., the DMA table associated with the preceding scheduling interval) will have been modified such that the present scheduling interval maximally utilizes the available link bandwidth. However, since the routine 300 may result in objectionable back and forth switching between VBR and CLBR streams (over a number of scheduling intervals), it may be desirable to process the selected streams to "smooth out" the objectionable switching such that no single user is unduly subjected to such switching. Thus, instead of exiting at step 336, the routine 300 of FIG. 3 may optionally proceed to a minimization routine 400, which will now be described with respect to FIG. 4.

Figure 4:
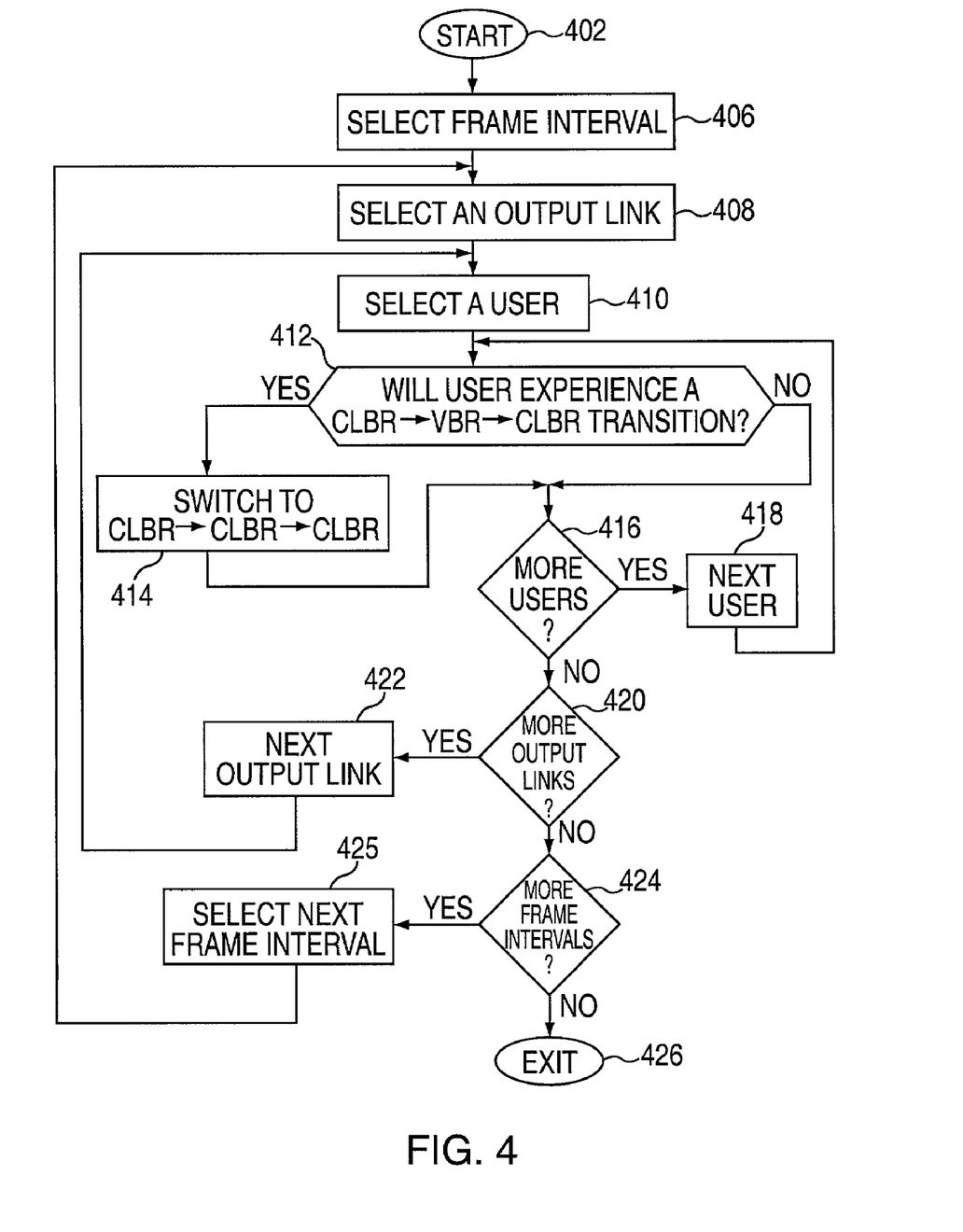
FIG. 4 depicts a flow diagram of a switch transient minimization routine 400 suitable for use in the apparatus of FIG. 1.

FIG. 4 depicts a minimization routine 400 suitable for use in the apparatus of FIG. 1 and in the routine 300 of FIG. 3. Specifically, FIG. 4 depicts a minimization routine 400 that is intended to minimize excessive switching between CLBR and VBR streams as experienced by a single user. As previously noted, switching back and forth between CLBR and VBR streams produces artifacts considered by the inventor to be more objectionable than the somewhat degraded quality of a CLBR stream (as compared to the quality of a VBR stream).

The routine 400 is entered at step 402, and proceeds to step 406 where the first frame interval of the present scheduling interval is selected. The routine 400 then proceeds to step 408.

At step 408 an output link, corresponding to an output information stream to be delivered to one or more subscribers via the communications link LINK, is selected. The routine 400 then proceeds to step 410. At step 410 a first of a plurality of users is selected for subsequent examination. The routine 400 then proceeds to step 412, where a query is made as to whether the selected user will experience a CLBR to VBR to CLBR switching transition. That is, a query is made as to whether, within a single frame interval, the selected user will switch between the CLBR stream and the VBR stream and back to the CLBR stream, thereby providing experiencing two objectionable switching events. If the query at step 412 is answered negatively, then the routine proceeds to step 416. If the query is answered affirmatively, then the routine 400 proceeds to step 414.

At step 414, the VBR portion of the user stream that is between the two identified CLBR portions is replaced by the CLBR stream corresponding to the VBR stream. That is, where three stream segments identified in step 412 (CLBR-VBR-CLBR) are present, the VBR extent is replaced by a corresponding CLBR extent such that the user does not experience two switching events. The routine 400 then proceeds to step 416.

At step 416 a query is made as to whether more users are to be processed. If the query at step 416 is answered affirmatively, then the routine 400 proceeds to step 418, where the next user is selected, and to step 412. If the query at step 416 is answered negatively, then the routine 400 proceeds to step 420.

At step 420 a query is made as to whether more output links are to be processed. If the query at step 420 is answered affirmatively, then the routine 400 proceeds to step 422, where the next output link is selected, and to step 410. If the query at step 420 is answered negatively, then the routine 400 proceeds to step 424.

At step 424 a query is made as to whether more frame intervals within the present scheduling interval remain to be processed. If the query at step 424 is answered affirmatively, then the routine 400 proceeds to step 425, where the next frame interval is selected, an to step 408. If the query at step 424 is answered negatively, then the routine 400 proceeds to step 426 where it is exited.

The above-described minimization routine 400 will, upon its full execution, result in the "smoothing" of excessive switching transitions so that users or subscribers within the information distribution 100 of FIG. 2 do not experience unpleasant and/or undesirable artifacts due to such excessive switching between CLBR and VBR streams.

In an embodiment of the invention, the server control packets included the following information for each file: 1) the minimum, average and maximum video bitrate for this file in packets/second. This is useful to know when a user initially starts playing a file, since the server needs to verify that there is enough output link bandwidth for the user. 2) the audio bitrate in packet/second.

This parameter is only needed if the audio data is stored separately from the video data and multiplexed on output. Storing the audio data separately from the video saves space and solves some of the issues in switching between the VBR and CLBR streams.

In an embodiment of the invention, the server control packets included the following information for each extent: 1) the average video packet rate for the extent in packets/second. 2) the frame rate. The frame rate is used to model the consumption of frames by the decoder and to compute the packet rate for each output frame time. 3) the number of access points in this extent.

In an embodiment of the invention, the server control packets included the following information for each access point (sequence header or I-frame): 1) a pointer (e.g., an offset or absolutely addressed packet number to the first CLBR packet of this access point. 2) a pointer (packet number) to the first VBR packet of this access point. 3) the number of frames in this sequence. 4) the average video packet rate for this sequence in packets/second. 5) the maximum per frame packet rate in this sequence in packets/second. 6) the frame rate. This is only needed if the frame rate is allowed to change at every sequence header. 7) a single bit flags indicating that (a) this access point begins with a sequence header; or (b) this access point marks splice in point; or (c) this access point marks splice out point.

In an embodiment of the invention, the server control packets included the following information for each frame: 1) a pointer (packet number) to the first packet of this frame. 2) an index of the access point that this frame belongs. Each frame is a variable size, so computing the entry point when switching from fast forward or reverse to normal play cannot be a simple division. Each access point may have a variable number of frames so an index into the access points will result in an error. Instead the starting position is computed in frames and this index is used to map a specific frame to the access point that contains it.

The above-described invention advantageously maximizes both link utilization and video quality by preferentially serving VBR content to a plurality of subscribers. Moreover, such maximization is achieved without processing the VBR or CLBR streams below (in the case of MPEG-like streams) the transport packet level. Even under heavy user demand, the video quality of one or mores streams may be reduced without significant visual artifacts (i.e., without 'glitches'). In this manner, costly link bandwidth (which is typically more expensive then disk bandwidth) may be preserved without resorting to "packet dropping" or other undesirable techniques.

Although various embodiments which incorporate the teachings of the present invention have been shown and described in detail herein, those skilled in the art can readily devise many other varied embodiments that still incorporate these teachings.

What is claimed is:

1. A computer readable medium for storing instructions which, when executed by a processor, perform steps comprising:
   retrieving, from a mass storage device in response to a program request from a user, respective segments of at least one of a variable bit rate (VBR) program stream and a constant low bit rate (CLBR) program stream, said VBR and CLBR bitstream segments comprising information associated with a common program to be served via a communications link; and
   providing at least one of a said VBR and said CLBR program stream segments to a communications link adapted to serve said requesting user in accordance with bandwidth availability indicia.

2. The computer readable medium of claim 1, wherein at least some CLBR bitstream segments are generated by transcoding corresponding VBR bitstream segments in response to said bandwidth availability indicia.

3. The computer readable medium of claim 2, wherein said CLBR coded bitstream segments are transcoded according to a bitrate constrained encoding algorithm.

4. The computer readable medium of claim 1, wherein said bandwidth availability indicia comprises at least one of an indicator of disk bandwidth and an indicator of communications link bandwidth.

5. The computer readable medium of claim 4, wherein both of said VBR and said corresponding CLBR bitstream segments are provided to said communications link in response to available disk bandwidth above a first threshold level.

6. The computer readable medium of claim 5, wherein only said VBR bitstream segments are provided to said communications link in response to available disk bandwidth below said first threshold level.

7. The computer readable medium of claim 5, wherein only said CLBR bitstream segments are provided to said communications link in response to available disk bandwidth below a second threshold level.

8. The computer readable medium of claim 1, wherein each of said VBR and CLBR bitstream segments comprise transport streams.

9. The computer readable medium of claim 1, wherein each of said VBR and CLBR bitstream segments comprise transport streams in substantial compliance with the MPEG-2 transport stream format.

10. The computer readable medium of claim 1, wherein said VBR coded bitstream segments are encoded according to a quality constrained encoding algorithm.

11. The computer readable medium of claim 1, wherein said CLBR coded bitstream segments are encoded according to a bitrate constrained encoding algorithm.

12. The computer readable medium of claim 1, wherein said transcoding process is adapted according to said bandwidth availability indicia.

13. A method for providing a program stream, comprising:
retrieving, from a mass storage device in response to a program request from a user, respective segments of at least one of a variable bit rate (VBR) program stream and a constant low bit rate (CLBR) program stream; and
providing at least one of a said VBR and said CLBR program stream segments to a communications link adapted to serve said requesting user in accordance with bandwidth availability indicia;
said VBR program stream comprising a first plurality of VBR coded bitstream segments, said CLBR program stream comprising a second plurality of CLBR bitstream segments, said VBR and CLBR program streams comprising information associated with said requested program.

14. The method of claim 13, wherein only said VBR program stream segments are retrieved from said mass storage device, said method further comprising:
transcoding said retrieved VBR program stream segments to produce corresponding CLBR program stream segments.

15. The method of claim 14, wherein said transcoding produces bitrate constrained CLBR program stream segments in response to a communications link bandwidth availability indicator.

16. The method of claim 13, wherein said bandwidth availability indicia comprises at least one of an indicator of disk bandwidth and an indicator of communications link bandwidth.

17. The method of claim 16, wherein both of said VBR and said corresponding CLBR bitstream segments are provided to said communications link in response to available disk bandwidth above a first threshold level.

18. The method of claim 17, wherein only said VBR bitstream segments are provided to said communications link in response to available disk bandwidth below said first threshold level.

19. The method of claim 17, wherein only said CLBR bitstream segments are provided to said communications link in response to available disk bandwidth below a second threshold level.

20. The method of claim 17, wherein said CLBR coded bitstream segments are encoded according to a bitrate constrained encoding algorithm.

21. The method of claim 14, wherein each of said VBR and CLBR program steams comprise transport streams.

22. The method of claim 13, wherein each of said VBR and CLBR program streams comprise transport streams in substantial compliance with the MPEG-2 transport stream format.

23. The method of claim 13, wherein said VBR coded bitstream segments are encoded according to a quality constrained encoding algorithm.

* * * * *

UNITED STATES PATENT AND TRADEMARK OFFICE
CERTIFICATE OF CORRECTION

| | |
|---|---|
| PATENT NO. | : 7,167,488 B2 |
| APPLICATION NO. | : 09/925216 |
| DATED | : January 23, 2007 |
| INVENTOR(S) | : Clement G. Taylor et al. |

It is certified that error appears in the above-identified patent and that said Letters Patent is hereby corrected as shown below:

Title Page:
    Page 1, Item 75, Inventors, line 2, delete "Princeton" and insert instead --Kendall Park--.
    Column 14, line 20, in claim 21, delete "claim 14" and insert instead --claim 13--; line 21, in claim 21, delete "steams" and insert instead --streams--.

Signed and Sealed this

Twenty-eighth Day of August, 2007

JON W. DUDAS
*Director of the United States Patent and Trademark Office*